(12) United States Patent
Avijit et al.

(10) Patent No.: US 6,929,748 B2
(45) Date of Patent: Aug. 16, 2005

(54) APPARATUS AND METHOD FOR CONTINUOUS ELECTRODEIONIZATION

(75) Inventors: Dey Avijit, Pare Vista (SG); Thomas Gareth Hugh, Honolulu Towers (SG)

(73) Assignee: Chemitreat PTE LTD, Singapore (SG)

( * ) Notice: Subject to any disclaimer, the term of this patent is extended or adjusted under 35 U.S.C. 154(b) by 258 days.

(21) Appl. No.: 10/402,014

(22) Filed: Mar. 28, 2003

(65) Prior Publication Data

US 2004/0188352 A1 Sep. 30, 2004

(51) Int. Cl.[7] ............................. B01D 61/00; B01D 59/44
(52) U.S. Cl. ...................... 210/652; 210/638; 210/641; 210/660; 210/663; 210/681; 210/900; 210/908; 204/524; 204/525
(58) Field of Search ............................... 210/651, 652, 210/653, 638, 257.2, 321.6, 195.2, 900, 908, 641, 660–663, 681; 204/524–525, 536, 529

(56) References Cited

U.S. PATENT DOCUMENTS

| | | | |
|---|---|---|---|
| 4,632,745 A | | 12/1986 | Giuffrida et al. |
| 4,787,980 A | * | 11/1988 | Ackermann et al. ........ 210/638 |
| 5,154,809 A | | 10/1992 | Oren et al. |
| 5,282,967 A | * | 2/1994 | Tatsuno et al. ............. 210/638 |
| 5,925,240 A | * | 7/1999 | Wilkins et al. ............... 210/88 |
| 6,056,878 A | * | 5/2000 | Tessier et al. .............. 210/639 |
| 6,086,754 A | * | 7/2000 | Watanabe ................... 210/139 |
| 6,254,753 B1 | * | 7/2001 | Mir ............................ 204/524 |
| 6,398,965 B1 | * | 6/2002 | Arba et al. ................. 210/652 |
| 6,607,668 B2 | * | 8/2003 | Rela ........................ 210/321.6 |
| 6,641,512 B2 | * | 11/2003 | Bryant et al. ................ 492/16 |
| 6,649,037 B2 | * | 11/2003 | Liang et al. ................ 204/632 |
| 6,808,608 B2 | * | 10/2004 | Srinivasan et al. ......... 204/533 |
| 6,824,662 B2 | * | 11/2004 | Liang et al. ................ 204/524 |
| 6,858,145 B2 | * | 2/2005 | Dey et al. ................... 210/640 |

* cited by examiner

*Primary Examiner*—Ana Fortuna
(74) *Attorney, Agent, or Firm*—Timothy J. Keefer; Seyfarth Shaw LLP

(57) ABSTRACT

A method of water purification including the steps of passing source water through at least one reverse osmosis unit to produce a product water and reject water, directing the product water from a reverse osmosis unit into the dilution stream of a continuous electrodeionization unit, directing the reject water from the first pass reverse osmosis unit through a softening unit to produce softening unit output water with fewer hardness elements than the reject water from the first pass reverse osmosis unit, directing the softening unit output water into a concentrate stream of the continuous electrodeionization unit, and wherein the continuous electrodeionization unit further purifies the water from the dilution stream to produce purified water.

60 Claims, 4 Drawing Sheets

APPARATUS AND METHOD FOR CONTINUOUS ELECTRODEIONIZATION

BACKGROUND OF THE INVENTION

1. Field of Invention

The present invention relates generally to a combined reverse osmosis/continuous electrodeionization water treatment system and, more particularly, to a combined reverse osmosis/continuous electrodeionization water treatment system for producing high-purity water.

2. Description of the Prior Art

The requirement for high-purity water with particular properties has evolved in several industries including the electronics industry, the power industry, and the pharmaceutical industry. The water purity requirements of the semiconductor industry are among the most stringent of any industry. Typically these applications require treatment of a source water supply (such as a municipal water supply) to reduce the level of contaminants. High-purity water processing procedures and the hardware required for carrying out the processing are complex and expensive. A current high-purity water specification is available in the ASTM D 5127-99 standard for electronics and semiconductor industry.

Ion exchanging resins have been used to produce deionized water. Other well known processes that can be used for water purification include distillation, electrodialysis, reverse osmosis, and liquid chromatography. These ion exchanging resins generally require chemical regeneration. On-site ion exchange regeneration requires aggressive chemicals that are dangerous to handle. Removal of the spent chemicals must be dealt with in a manner that is safe for the environment. In this respect, attention has been drawn in recent years to a self-regenerating type deionizing apparatus. To avoid the use of aggressive chemicals, a deionizing function of the ion exchanging resins and an electrodialysis function of ion exchange membranes are combined in an electrodeionization apparatus to obtain high-purity deionized water without chemical regeneration (U.S. Pat. No. 6,274,019). Electrodeionization is a water purification technique that utilizes ion exchanging resins, ion exchange membranes, and electricity to deionize water (for a more detailed discussion see Wilkins, F. C., and McConnelee, P. A. "Continuous Deionization in the Preparation of Micro-electronics Grade Water", Solid State Technology, pp 87–92, August 1988). Electrodeionization is differentiated from electrodialysis by the presence of ion exchange resin in the purifying compartments. Illustrative of other prior art attempts to use the combination of electrodialysis and ion exchanging resins to purify saline from are described in U.S. Pat. Nos. 2,796,395; 2,947,688; 2,923,674; 3,014,855; 3,384,568; and 4,165,273.

The use of electrodeionization is disclosed in U.S. Pat. Nos. 2,689,826; 2,815,320; 3,149,061; 3,291,713; 3,330,750; and many others. A commercially successful electrodeionization apparatus and process is described in U.S. Pat. No. 4,632,745. The basic repeating element, called a cell pair, consists of a purifying compartment, bounded on each side by an anion membrane and a cation membrane, which is filled with a mixed bed ion exchanging resin, and a concentrating compartment (see Wilkins and McConnelee). The feedwater entering the electrodeionization apparatus is separated into at least three parts. A small percentage flows over the electrodes, a majority of the feed water passes through the purifying compartment and the remainder passes along the concentrating compartments. Under the influence of D.C. Potential, ions in the purifying compartment are transferred into the adjacent concentrating compartment. Ions entering the resin-filled purifying compartment transfer through the resin and the ion exchange membranes in the direction of the electrical potential gradient, into the concentrating compartment (See Liang, L. S., Wood, J., and Hass W., "Design and Performance of Electrodeionization System in Power Plant Applications", Ultrapure Water pp, 41–48, October 1992). As a result, ions in the water will become depleted in the purifying compartments and will be concentrated in the adjacent concentrating compartments. The third stream is the electrode stream that sweeps past the electrodes removing gases from electrode reactions as it flows. The percentage of the incoming feedwater that becomes purified product is referred to as the recovery of the system. In conventional electrodeionization systems with reverse osmosis product as feed, the concentrate stream can typically be recirculated to obtain recoveries in the range of 80 to 95% (see Liang et al.). U.S. Pat. No. 6,193,869 discloses the use of modular system design.

The power supply may be a constant current or a constant voltage power supply. Presently, electrodeionization apparatuses typically operate using a constant voltage power supply, in which the current is varied to maintain a constant voltage. Unfortunately, it has been observed that the electrical impedance of electrodeionization apparatuses increases with the age of the module. This impedance increase means that as the electrodeionization apparatus ages, the current passing through the apparatus decreases when powered with a constant voltage power supply (as described in U.S. Pat. No. 6,365,023). This results in the poor treated water quality from the electrodeionization apparatus. Similarly, a new electrodeionization apparatus having low impedance and run at a constant voltage can produce a very high current. Further, scaling of electrodeionization apparatus can be a problem where there is more current than necessary applied to the apparatus. Impedance of an electrodeionization apparatus increases with decreasing temperature. As a result, the risk of scaling may be low in winter. U.S. Pat. No. 6,365,023 suggests the use of constant-current power supply. Ionic removal is accomplished here by supplying a constant electrical current in the range of about 1.5 to 15 times a theoretical minimum current.

In electrodeionization devices a gasket positioned between anion and cation exchange membranes forms purifying compartments. U.S. Pat. Nos. 4,632,745; 4,747,929; 4,925,541; 4,931,160; 4,956,071; and 5,120,416 describe gasket design in electrodeionization apparatus. A need also exists for a gasket that assures good fluid flow and electrical current distribution and that has a low overall pressure drop for fluid flow (see for example U.S. Pat. No. 6,123,823).

U.S. Pat. No. 4,925,541 discloses a plate and frame electrodeionization apparatus and method. Plate and frame apparatuses are large in size and typically suffer from leaks because of the difficulty in sealing large vessels. Spiral-wound modules (U.S. Pat. No. 5,376,253 and Rychen P., Alonso S., and Alt H. P., "High-purity Water Production with the Latest Modular Electrodeionization Technology", Ultrapure Water Europe, Amsterdam, 1996) and helical modules (U.S. Pat. No. 6,190,528) are also available.

The ion exchanging materials are commonly mixtures of cation exchanging resins and anion exchanging resins (e.g. U.S. Pat. No. 4,632,745), but alternating layers of these resins have also been described (e.g. U.S. Pat. Nos. 5,858,191 and 5,308,467). Because of their ability to exchange counter-ions, ion exchange resins are electrically conductive (Heymann E., and O'Donnell I. J., Journal of Colloid Science, Volume 4, pp 395, 1949). The resin-filled purifying compartments facilitate ion transfer along contiguous ion exchange beads by creating a low resistance electrical path, even in a highly purified solution with high resistivity (see Griffin C., "Advancements in the Use of Continuous Deionization in the Production of High-purity Water", Ultrapure Water, pp 52–60, November 1991). A path is developed through the ion exchange resin beads that is much lower in electrical resistance than the path through the surrounding bulk solution, thereby facilitating removal of ions from the device (see Ganzi G. C., "The Ionpure™ Continuous Deionization Process: Effect of Electrical Current Distribution on Performance", Presented at the 80$^{th}$ Annual AIChE Meeting, Washington D.C., November 1988). Strongly dissociated ion exchanging resins have specific electrical resistances of order of magnitude about 100 ohm-cm, i.e., about the same as an aqueous solution containing about 0.1 gram-equivalent of sodium chloride per liter. U.S. Pat. No. 5,593,563 discloses the use of electron conductive particles such as metal particle and/or carbon particles in the cathode compartment. U.S. Pat. No. 5,868,915 discloses the use of chemical, temperature, and fouling resistant synthetic carbonaceous adsorbent particles (0.5–1.0 mm diameter) in either electrolyte compartments, purifying compartments, or concentrating compartments. It is important to note that the presence of gases, poor flow distribution, low temperature and/or low conductance liquids within the electrolyte compartments may be detrimental to electric current distribution, thereby reducing the efficiency of deionization.

Undesirably, where mixed bed ion exchanging materials are used, the thickness of the purifying compartments must be necessarily thin to maximize the transport efficiency of impurity ions through the resins to the membranes (U.S. Pat. No. 6,197,174). Thinner diluting compartments dictate higher manufacturing cost. U.S. Pat. No. 4,636,296 discloses an electrodeionization apparatus containing alternating layers of anionic and cationic exchanging resins to mitigate this problem. U.S. Pat. No. 6,197,174 discloses the use of one mixed bed phase of anion and cation resins and at least one single phase, adjacent to the mixed bed phase. U.S. Pat. No. 6,156,180 discloses the use of a continuous phase of a first ion exchanging resin material containing therein a dispersed phase of clusters of a second ion exchanging resin material in the purifying compartments. This arrangement allows an increase in the thickness and size of the purifying compartments thereby permitting more resin to be placed in the purifying compartments and decreasing the necessary membrane area for a given flow rate.

When uniform-bead size resins were placed in the purifying compartments, increased ion exchange rate and accordingly better salt removal was found (see Griffin). This is due to an increase in the resin surface area and also due to an effective increase in the amount of resin active in the electrical circuit within the system. U.S. Pat. No. 5,308,466 discloses the use of low crosslinked ion exchange resin or membrane to lower the resistance of the resin or membrane. Such resins or membranes have greater interstitial water content, a greater pore size, and a decreased charge density as compared to resins and membranes having higher degrees of crosslinking. U.S. Pat. No. 5,858,191 discloses the use of Type II anion exchanging resin material, alone or with Type I anion exchanging resin material, in anion permeable membranes and/or resins to improve the electric current distribution, degree of resin regeneration, and deionization performance. The use of doped cation exchanging resin and Type I anion exchanging resin materials in the purifying compartments to reduce the difference in conductivity between the alternating layers is disclosed in U.S. Pat. No. 6,284,124. U.S. Pat. No. 6,312,577 discloses the use of macroporous ion exchanging resins that are both highly crosslinked and have a high water content. This system provides an improved removal of weakly ionized ions, particularly silica.

When ions are readily present in the feedwater, charge will pass through the purifying compartment as ions migrate into the concentrating compartment. But as these ions are removed, a point will be reached within the electrodeionization system where insufficient ions are available to carry the charge being generated at the electrodes. The resistance across the cells will substantially increase, resulting in an increase in voltage. The voltage differential across the purifying chamber will increase until it is sufficient to split water into its $H^+$ ions and $OH^-$ ions (see Byrne W., Encyclopaedia of Water Treatment, Volume X: EDR & EDI, Version U 1.0, Wes Byrne and the Company for Educational Advancement (CEA), 1999). In electrodeionization apparatus, $H^+$ ions and $OH^-$ ions are formed by dissociation of the water to continuously regenerate the ion exchanging resins filled in the purifying compartments so that the electrodeionization apparatus can efficiently deionize water. The high electric voltage in the dilute compartment not only splits water, but also destroys some of the low molecular weight organics that pass through the preceding reverse osmosis system (Auerswald, D., "Optimising the Performance of a Reverse Osmosis/Continuous Electrodeionization System", Ultrapure Water, pp 35–52, May/June 1996). Electric current more than the theoretical amount required to discharge ions from feedwater is supplied to cause dissociation of water in the purifying compartments so as to continuously regenerate the ion exchanging resins. The passage of 96, 500 coulombs (one Faraday) causes the transfer of one chemical equivalent of a salt theoretically.

It has been shown (see Glueckauf E., "Electrodeionisation Through a Packed Bed", British Chemical Engineering, pp 646–651, December 1959) that the mechanism of ion removal from purifying compartments to adjacent concentrating compartments involves the diffusion of ions to the resin phase and subsequent electrical conduction within the resin phase to the bounding membranes of the purifying compartment. In order to achieve high rates of ion removal, the cation exchanging resin should be predominantly in the hydrogen form and the anion exchanging resin should be predominantly in the hydroxide form. At the end of the purifying compartments, where water is relatively free off ions, splitting of water occurs in the electric field. This generates hydrogen and hydroxyl ions. The creation of $H^+$ ions and $OH^-$ ions from water splitting allows the resins to remain in the hydrogen and hydroxide forms. Moreover, the resins in the regenerated forms can react with weakly ionized species, allowing transfer of the species that would not otherwise occur (as described by Ganzi).

The random nature of mixtures of cation and anion exchanging resins tends to cause some portion of the resins to be regenerated to a needlessly high degree and others inadequately regenerated. The achievement of a uniform distribution of water splitting is a more difficult problem and much effort has gone into designing structures that achieve this (for examples see U.S. Pat. Nos. 6,241,867; 5,858,191; 5,868,915 and 5,308,467).

Scaling has been found to occur in localized regions of electrodeionization apparatus, and particularly those where high pH is typically present. It is believed that the pH at the boundary layer increases with current. Therefore, the current needs to be maintained at a sufficiently low level to prevent or, at least ameliorate the incidence of scaling. If the current is too low, poor water quality is obtained. If the current is too high, the incidence of scaling increases (U.S. Pat. No. 6,365,023). One difficulty in utilizing electrodeionization apparatuses is the deposit of insoluble scale within the cathode compartment primarily due to the presence of calcium, magnesium, and bicarbonate ions in the liquid, which contact the basic environment of the cathode compartment. Scaling can also occur in the concentrating compartments under conditions of high water recovery. In order for calcium carbonate to precipitate in solution the Langelier Saturation Index (LSI) has to be positive. In the cathode compartment the pH can be high enough for the LSI to be positive. The LSI of reverse osmosis product water is always negative. The LSI is even negative in the electrodeionization concentrate stream. Thus, on the basis of consideration of LSI alone, one would not expect the precipitation of calcium carbonate that occurs within concentrating compartments. This phenomenon is instead explainable upon local conditions (U.S. Pat. No. 6,296,751). When the electrodeionization apparatus is in operation, pH near a surface of the anion exchange membrane locally becomes alkaline. $CO_3^{2-}$ or $HCO_3^-$ and $OH^-$ permeating the anion exchange membrane from the purifying compartments are concentrated near the anion exchange membrane. In addition, hardness contributing polyvalent cations in water in the concentrating compartments are drawn or driven to the anion exchange membrane, so that $CO_3^{2-}$ or $HCO_3^-$ and $OH^-$ react with $Ca^{2+}$ to form scales of calcium carbonate on the anion exchange membrane. Build-up of scale can result in an increase in the resistance to the flows of electricity and water through the stack. When scales are formed, the electrical resistance at the area where the scales are formed increases and less electric current flows at that section. At the extreme condition, sufficient current for ion removal cannot be applied within the maximum voltage of the device, and the quality of the treated water deteriorates. Prevention of scale formation typically focuses on removing polyvalent cations from the supply stream by adding water softener. Vendors of the electrodeionization apparatuses suggest that the concentration of calcium in the feed to the system be limited to very low levels; e.g., less than 0.5 ppm (US Filter Literature No. US2006). U.S. Pat. No. 5,308,466 discloses an electrodeionization apparatus utilizing concentrating compartments containing ion exchanging resins. If the concentrating compartments are filled with the ion exchanging resins, the $OH^-$ ions permeating through the anion exchange membrane are easy to move in the concentrating compartments, so that the scale is dispersed (U.S. Pat. No. 6,379,518). Acid may be added to convert some of the alkalinity to carbonic acid, and to increase the solubility of carbonate and sulphate salts. The addition of an acidic solution to the concentrate water is disclosed in U.S. Pat. No. 6,274,019. The use of an acidic solution in the concentrate water increases the solubility of the hardness components within the concentrate water and prevents scale formation. The use of effective amount of antiscalant in the concentrating compartments and anode and cathode compartments to inhibit precipitation of scale is disclosed in U.S. Pat. No. 6,056,878. Physical damage can be inflicted on stack components by severe scaling.

U.S. Pat. No. 6,296,751 discloses the use of first and second stages in the electrodeionization apparatus. The purifying compartments of the first stage include only anion exchanging resin or cation exchanging resin material, and thus remove either anions or cations but not the other. The purifying compartments of the second stage receive the purifying compartment effluent from the first stage and include the other type of exchanging resin or a mixed resin material and remove the oppositely charged ions. The concentrate from the first stage is isolated from the second stage to prevent the scaling of sparingly soluble salts in the concentrating compartments.

The use of opposite flow directions for supply stream and concentrate stream is disclosed in U.S. Pat. No. 6,248,226. In conjunction with the use of opposite flow direction, the introduction of a porous diaphragm or ion conducting membrane to divide the concentrating compartments into first and second compartments is disclosed in U.S. Pat. No. 6,149,788 to inhibit scaling. The porous diaphragm or ion conducting membrane effectively eliminates convective transport of scale-forming metallic cations from the cation exchange membrane side of the concentrating compartments to the anion exchange membrane side of the concentrating compartments, thereby inhibiting scale formation on the anion exchange membrane.

Deposits of colloids, organic contaminants, and other impurities on the surface of the membranes and ion exchanging resins generally result in an increase in electrical resistance: this may also result in an increase in the hydraulic resistance in the compartments of the stack and in a decrease in current efficiency (U.S. Pat. No. 5,026,465).

The use of electrodeionization polarity reversal is disclosed in U.S. Pat. No. 5,026,465 to reduce scaling and fouling tendencies by salt precipitates, colloids, organic contaminants, and other impurities. The use of polarity reversal in electrodialysis processes are disclosed in U.S. Pat. Nos. 2,863,813; 3,341,441; 4,115,225; and 4,381,232.

BRIEF SUMMARY OF INVENTION

It is the object of the invention to provide an improved combined reverse osmosis and electrodeionization system for purifying water, or to at least provide the public with a useful choice.

Accordingly to the present invention there is provided a method of water purification including the steps of passing source water through at least one reverse osmosis unit to produce a product water and reject water, directing the product water from a reverse osmosis unit into the dilution stream of a continuous electrodeionization unit, directing the reject water from the first pass reverse osmosis unit through a softening unit to produce softening unit output water with fewer hardness elements than the reject water from the first pass reverse osmosis unit, directing the softening unit output water into a concentrate stream of the continuous electrodeionization unit, and wherein the continuous electrodeionization unit further purifies the water from the dilution stream to produce purified water.

In the reverse osmosis unit source water is divided into two portions, reject portion water and product portion water. In the reverse osmosis unit the reject portion water becomes more concentrated and the product portion water more dilute as water molecules from the reject portion water pass through at least one membrane into the product portion water. The reject portion water exits the reverse osmosis unit as reject water and the product portion water exits the reverse osmosis operation as product water.

The continuous electrodeionization device has an anode, a cathode, a plurality of cation exchange membranes and a plurality of anion exchange membranes. The anion and cation exchange membranes are arranged to form an anode compartment, a cathode compartment, at least two concentration compartments and at least one purifying compartment. These compartments are formed between the anode and the cathode. A concentrate stream, including reject water from the first pass reverse osmosis operation, is provided to the concentration compartments, the anode compartment and the cathode compartment. A supply stream of reverse osmosis product water provided to the purifying compartment. When sufficient power is provided to the anode and cathode of the electrodeionization device, anions in the supply stream flow through the anion exchange membrane into a concentration compartment and cations in the supply stream flow through the cation exchange membrane into a concentration compartment. This reduces ions in the water in the purifying compartment. Water exits the purifying compartment as pure product water.

Before the reject water from the first pass reverse osmosis unit is provided to the continuous electrodeionization unit it must undergo a process to remove hardness. Four different softening processes are preferred: a standard reverse flow softener containing a uniform particle size strong acid cation resin, a weak acid cation exchanger containing resin with carboxylic acid groups, an ion exchanger containing suitable macroreticular type aminophosphonic functional groups chelating resin, or an ion exchanger containing suitable macroreticular type iminodiacetic acid functional groups chelating resin.

BRIEF DESCRIPTION OF THE SEVERAL VIEWS OF THE DRAWINGS

The invention will be further described by way of example only and without intending to be limiting with reference to the following drawings, wherein.

DETAILED DESCRIPTION OF THE INVENTION

Figure 1:
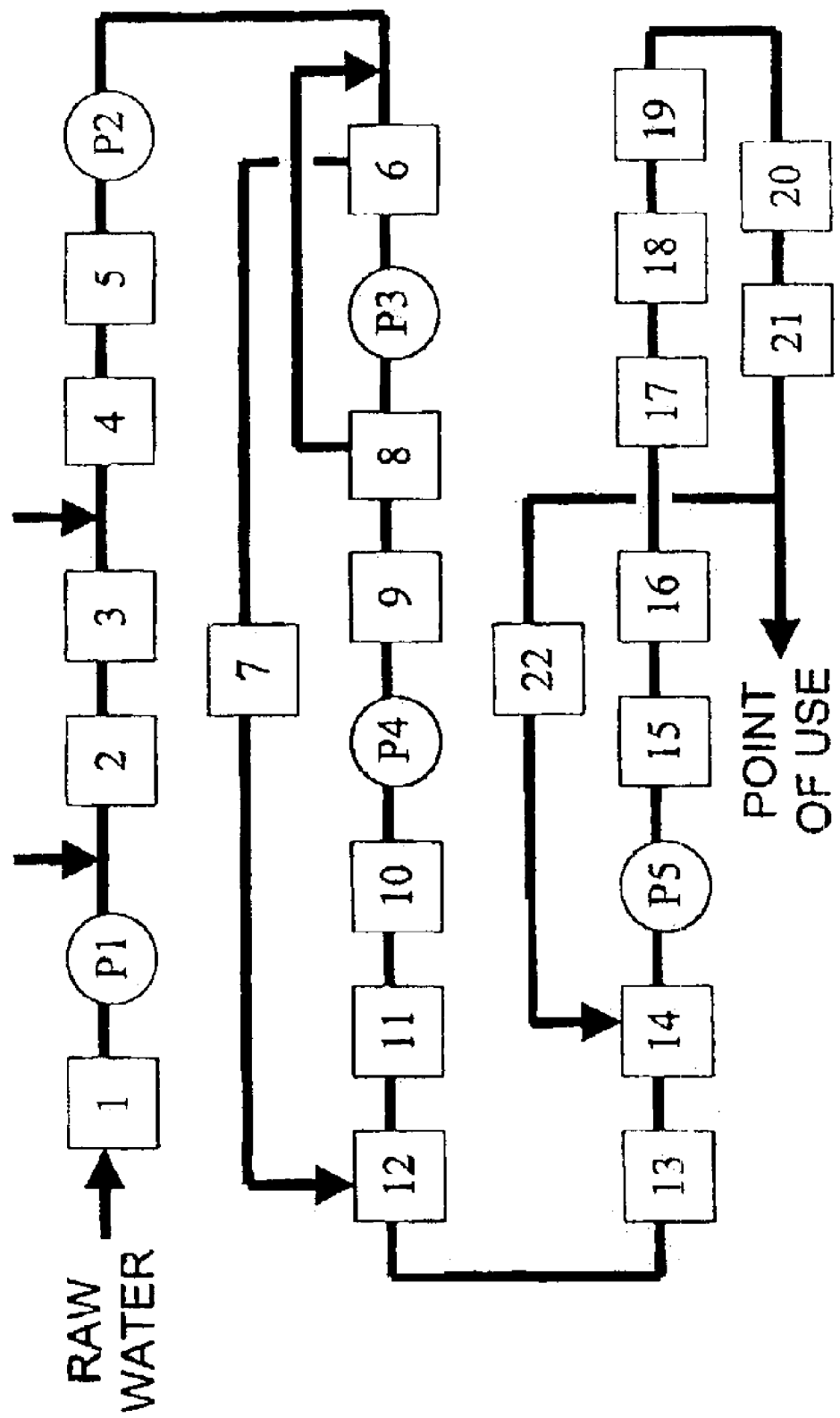
FIG. 1 is a flow diagram of a preferred embodiment of water purification method of the invention.

FIG. 1 illustrates the high-purity water system used in the present experimental study. The drawing is a flow chart of one embodiment for carrying out this invention, wherein are shown a raw water storage tank 1, an in-line static mixer 2, a multimedia filter 3, an activated carbon filter 4, a 1 micron nominal cartridge filter 5, first-pass reverse osmosis membrane filter 6, an ion exchange unit for the removal of hardness 7, second-pass reverse osmosis membrane filter 8, a permeate storage tank 9, a primary UV TOC (total organic carbon) reducer 10, a primary membrane degassifier 11, a continuous electro-deionizer (CEDI) 12, a primary mixed bed deionizer 13, a deionized water storage tank 14, a plate type heat exchanger 15, a secondary UV TOC reducer 16, a sacrificial polishing mixed bed deionizer 17, a secondary membrane degassifier 18, an UV disinfection unit 19, a 0.1 micron absolute cartridge filter 20, an ultrafiltration membrane 21, an UV disinfection unit 22 in the return line, and pumps P1–P5.

City water is received in the raw water storage tank 1 and is pumped by a multi-stage vertical centrifugal pump P1 through the multimedia filter 3 for the reduction of suspended solids. Coagulant (PAC) is added before the multimedia filter 3 for coagulation of suspended solids and an in-line static-mixer 2 is provided to ensure the proper mixing of the coagulant with water. The filtered water from multimedia filter 3 passes through the activated carbon filter 4 for the removal of organics and residual chlorine. Sodium bisulphite dosing is provided prior to the activated carbon filter 4 for the removal of free chlorine and dissolved oxygen. The treated water from the activated carbon filter 4 is then taken through a 1-micron cartridge filter 5 for the removal of fine solids.

The two-pass reverse osmosis (RO) system includes high-pressure flooded suction multi-stage vertical centrifugal pumps P2 and P3, first-pass reverse osmosis membrane filters 6 and second-pass reverse osmosis membrane filters 8. Caustic soda is added between the two passes to improve the performance of the membrane filters with respect to the rejection of weakly ionized silica, boron, and organics in the second-pass reverse osmosis membrane filter 8. Spiral-wound polyamide composite reverse osmosis membranes are used for reverse osmosis filters 6 and 8. The reject stream from the second-pass reverse osmosis membrane filters 8 is recycled back to the first-pass feed stream. Permeate (product water) from the two-pass reverse osmosis system is taken to permeate storage tank 9. From the permeate storage tank 9, water is pumped by a multi-stage vertical centrifugal pump P4 through the primary UV TOC reducers 10 for the reduction of organic content in the water. Water from the primary UV TOC reducer 10 passes through the primary membrane degassifier 11 for the removal of dissolved gases and volatile organics. Finally it passed through the CEDI unit 12 followed by the primary mixed bed deionizer 13 for the reduction of ionic impurities in the water.

From the make-up treatment loop, water is taken to the deionized water storage tank 14. This tank 14 is nitrogen blanketed to ensure that the water inside the tank is not contaminated from the outside air. Water is pumped by high-pressure flooded suction multi-stage vertical centrifugal pump P5 through the heat exchanger 15 to reduce the temperature and is then passed through the secondary UV TOC Reducer 16 for the removal of residual organics. The secondary UV TOC Reducer 16 removes TOC down to sub-ppb level at conventional 33% recirculation rate in the polishing loop. The water from the outlet of this secondary UV TOC Unit 16 passes through a sacrificial polishing mixed bed deionizer 17 followed by a secondary membrane degassifier 18. The resin in the sacrificial polishing mixed bed deionizer 17 is a non-regenerable type. The sacrificial polishing mixed bed deionizer 17 removes ionic impurities down to ppt levels. The secondary membrane degassifier 18 removes dissolved oxygen down to sub-ppb level. Water from the secondary membrane degassifier 18 passes through an UV disinfection unit 19 followed by a 0.1 micron absolute cartridge Filter 20. The UV disinfection unit 19 is used as a sterilant in the preparation of high-purity water. The sterilized water from the UV disinfection unit 19 is then taken to a 0.1-micron absolute cartridge filter 20 for the removal of ultra-fine particles. The Ultrafiltration (UF) Unit 21 is the final equipment in the polishing loop and the product water from this UF unit 21 is monitored continuously for flow, pressure, temperature, resistivity, particle count, TOC, and dissolved oxygen. This UF unit 21 at the Point-of-use (POU) further reinforces the ultra-fine particle removal action to achieve a particle count down to less than 300/liter of 50 nm size particles. Return water from POU is taken back to the deionized water storage tank 14 through a return UV disinfection unit 22 to maintain the sterile condition.

Although FIG. 1 shows a two pass reverse osmosis system, these reverse osmosis systems can each be single or multiple arrays of units in series depending upon the necessity of the use of concentrate staging to improve the recovery of each system. More or fewer reverse osmosis systems may be used. For example, only one reverse osmosis system may be used.

Before the first pass reverse osmosis reject stream is provided to the continuous electrodeionization unit the reject stream passes through ion exchange unit 7 to remove hardness elements. Ion exchange unit 7 removes polyvalent cations from the reject stream. This assists in achieving adequate concentrate stream conductivity in the electrodeionization apparatus. In this case it is preferable to remove polyvalent cations in the first pass reject stream so as to make the local Langelier Saturation Index (LSI) in the concentrate stream negative. In preferred embodiments of the invention one of four systems is used to remove hardness elements from the first pass reverse osmosis reject stream: standard reverse flow softening, softening by passage through/past a weak acid cation resin, softening with a suitable aminophosphonic or iminodiacetic acid functional group chelating resin.

In a preferred embodiment when the water softening system uses a standard reverse flow softener containing a uniform particle size strong acid cation resin, the strong acid cation resin is in the sodium form.

In a preferred embodiment when the water softening system uses passage through or past a weak acid cation resin to soften the water, the weak acid cation resin is in the sodium form.

Water softening is used for the removal of calcium and magnesium ions, which are the hardness (scale) forming constituents of water. The standard reverse flow softener is highly effective, yet relatively simple. Hard water is passed through a column of sodium form strong acid cation exchange resin, which replaces the objectionable calcium and magnesium ions with non-objectionable sodium ions. When the capacity of the resin for absorbing calcium and magnesium ions is exhausted, the column is regenerated with salt solution in a direction opposite to the service flow. For most first pass reverse osmosis reject waters after passing through the reverse flow softener the output water has hardness below about 1.5 ppm as calcium carbonate. Once the reverse flow softener is exhausted it needs to be regenerated. Regeneration can be achieved with a 10% brine solution at a regeneration level in the vicinity of 150 grams per liter of resin.

The use of the weak acid cation resin in the sodium form for the removal of hardness is equivalent to carbosoft process. In order to effectively soften waters, which contain high total dissolved solids (TDS), it is necessary to employ a weak acid cation resin in the sodium form. This technique, involving a two-step regeneration, has been called the carbosoft process. In the sodium form, there is a higher selectivity for calcium and magnesium than is shown by the conventional strong acid cation exchangers. The exhausted resin is first regenerated with relatively high levels of acid and this is followed by sodium hydroxide. Softening in the sodium cycle requires that the acid-regenerated form be converted directly to the working sodium form. The resins have an expansion of around 50–60% when converted from hydrogen form to the sodium form. The ion exchange vessel needs to be large enough to allow for this expansion. Using a weak acid cation resin in the sodium form output water can be provided with hardness below about 0.5 ppm as calcium carbonate for most first pass reverse osmosis reject waters. The feed water entering the weak acid cation resin may require pH adjustment using either sodium hydroxide or sodium carbonate to increase the alkalinity of the feed water up to a total hardness level. When the weak acid cation resin has been exhausted it requires regeneration. The regeneration may comprise a 5% hydrochloric acid at a regeneration ratio of about 110% followed by conditioning with a 5% sodium hydroxide solution. To avoid bed compression the weak acid cation resin may use an upflow technique for sodium conversion.

Macroreticular type chelating resins with aminophosphonic or iminodiacetic acid functional groups possess a high selectivity for calcium, magnesium, and strontium as well as heavy metal cations over alkali metal ions, such as sodium. The selective nature of such resins allow the removal of hardness from water streams down to ppb levels as well as the removal of heavy metals from solution. The exhausted resin is first regenerated with relatively high levels of acid and this is followed by sodium hydroxide. Softening in the sodium cycle requires that the acid-regenerated form be converted directly to the working sodium form. Such resin has an expansion of around 40–45% when converted from hydrogen form to the sodium form. The ion exchange vessel needs to be large enough to account for this expansion.

When the softening operation using macroreticular type aminophosphonic functional groups chelating resin the output water from the softening operation achieves hardness of below about 25 ppb as calcium carbonate for most first pass reverse osmosis reject waters. The macroreticular type aminophosphonic functional groups chelating resin runs at space velocity of about 15 BV/h for optimum operating efficiency. The macroreticular type aminophosphonic functional groups chelating resin uses an upflow technique to prevent bed compression for sodium conversion.

When the softening operation using macroreticular type iminodiacetic functional groups chelating resin the output water from the softening operation achieves hardness of below about 25 ppb as calcium carbonate for most first pass reverse osmosis reject waters. The macroreticular type iminodiacetic functional groups chelating resin runs at space velocity of about 15 BV/h for optimum operating efficiency. The macroreticular type iminodiacetic functional groups chelating resin uses an upflow technique to prevent bed compression for sodium conversion.

Figure 2:
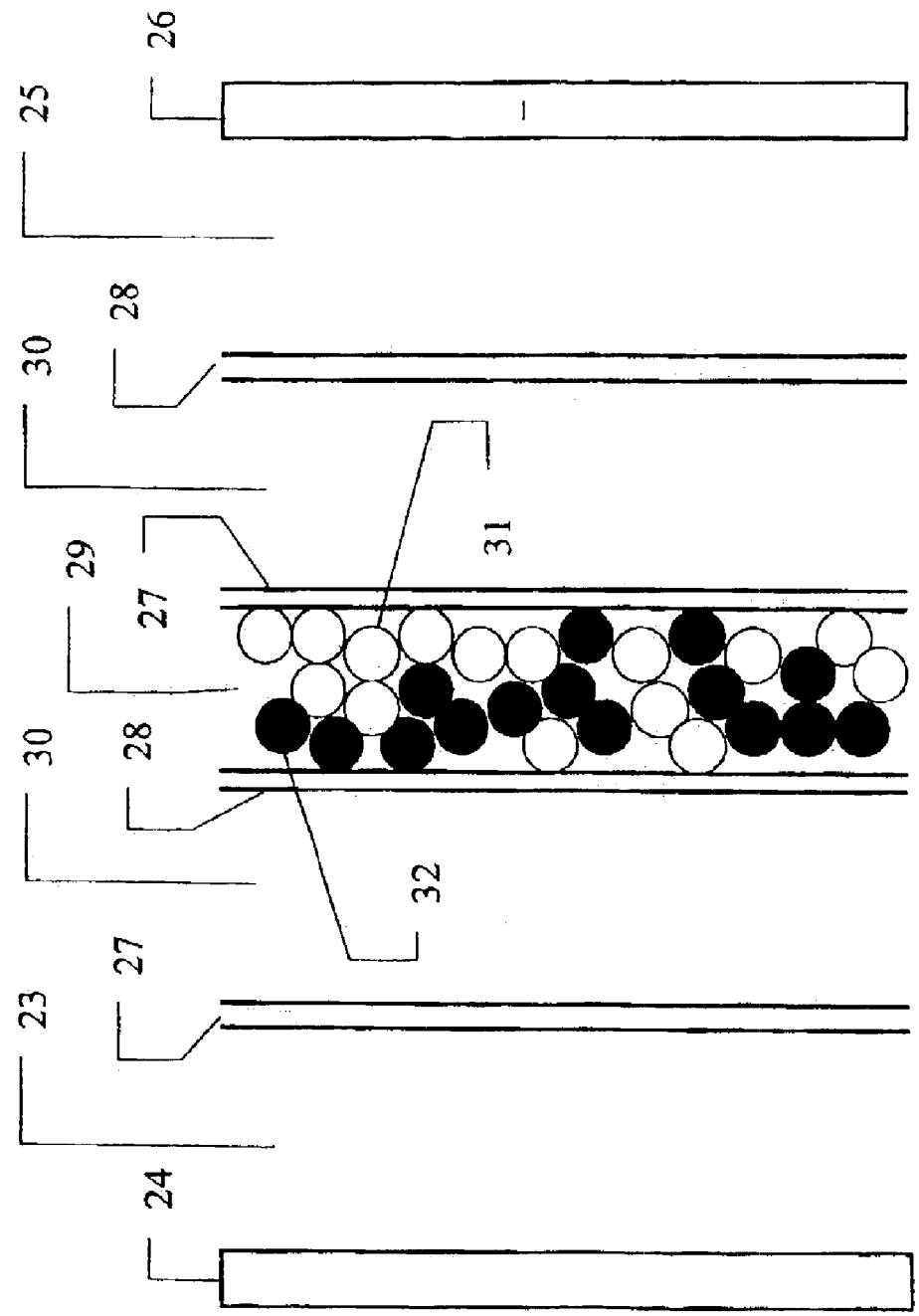
FIG. 2 is an outline of a basic continuous electrodeionization device.

FIG. 2 is a cross-sectional illustration of a portion of the CEDI apparatus 12 used in the present experimental study. The CEDI Unit 12 comprises the anode compartment 23 provided with an anode 24 and the cathode compartment 25 provided with a cathode 26. A plurality of cation exchange membranes 27 and anion exchange membranes 28 are alternately arranged between the anode compartment 23 and the cathode compartment 25 to form purifying compartment 29 and concentrating compartment 30. The purifying compartment 29 is bounded on the anode side by an anion permeable membrane 28 and on the cathode side by a cation permeable membrane 27. The adjacent concentrating compartments 30 are each correspondingly bounded by a cation permeable membrane 27 on the anode side and an anion permeable membrane 28 on the cathode side. The electroactive media utilized in the purifying compartment 29 includes a mixture of anion 31 and cation 32 ion exchange resin beads. The ion exchange materials 31 and 32 preferably are ion exchange resin particles in the form of beads. The second pass reverse osmosis product water is further treated by the primary UV TOC reducer 10 and the primary membrane degassifier 11 prior to entering the purifying compartment 29 which contains substantially uniform size resin beads. Similarly, the first pass reverse osmosis reject water is further treated by the ion exchange unit 7 for the removal of hardness prior to entering the concentrating compartments 30 and the anode and cathode compartments 23, 25.

It should be noted that the continuous electrodeionization unit may include more than one purifying compartment and more than two concentrating compartments.

Ion exchange membranes are made of ion exchange resins manufactured in sheet form. Membranes of a particular fixed charge are permeable to counter-ions and impermeable to co-ions. Ion exchange membranes are also impermeable to water, and therefore act as a barrier to bulk liquid flow while allowing the transfer of counter-ions under the influence of an electric potential.

By circulating and reusing the concentrate water, the water utilization rate is improved and a reasonable ion concentration in the concentrating compartment is maintained. The concentrate flowrate through its compartment must be sufficient to maintain turbulence, and to keep pressure drops within their desired range. Little flexibility is available for reducing flow as a means of obtaining better water recovery from the system. A certain percentage of the concentrate flow must go to the drain. The increase in the electric current flow due to higher electrical conductivity of the concentrate water reduces the power consumption of the device because the applied voltage can be made smaller. Higher conductivity in the concentrate stream facilitates the transfer of current while back-diffusion can limit effluent quality. Increasing the flowrate of the concentrate stream prevents scales from forming in the concentrate compartments. In a conventional system, it is desirable to limit the recovery to reduce the rate of scale formation in the concentrating compartments, or possibly to reduce the effects of back diffusion.

Figure 3:
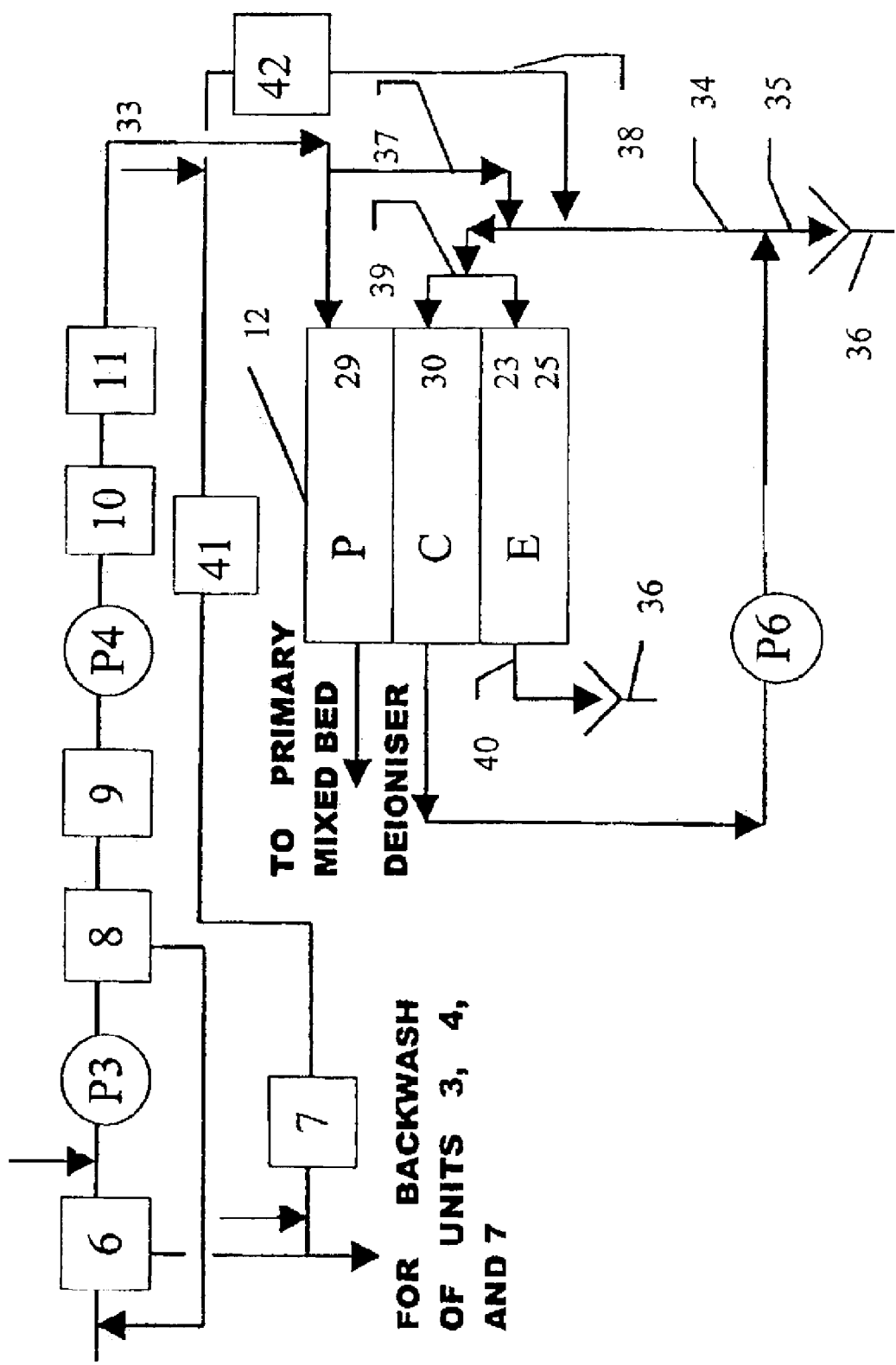
FIG. 3 is a flow diagram of one embodiment of combined reverse osmosis and continuous electrodeionization device.

Referring to FIG. 3, the CEDI Unit 12 in accordance with the present invention is described in more detail. The feed to the electrodeionization system is split into two streams, the supply stream 33 and the make-up stream 37 to the concentrating loop 34. Water to be treated is introduced into the purifying compartments 29 from supply stream 33. The supply stream 33 is deionized as it flows through the purifying compartments 29 in the system. In order to achieve the target effluent water quality, the water in the concentrating loop 34 must be sufficiently conductive for the required current to be passed. The concentrating loop 34 comprises a pump P6 to recycle concentrate solution, a concentrate bleed-off line 35 to drain 36, a make-up stream 37 from supply stream 33, and another high conductivity softened water make-up stream 38 from an ion exchange unit 7. Ion exchange equipment 7 can be either standard reverse flow softener or weak acid cation exchanger in the sodium form, or ion exchanger containing macroreticular type aminophosphonic or iminodiacetic functional groups chelating resin. A pressure reducing valve (PRV) 41 is used in the make-up stream 38 to ensure that the concentrate and electrode feed stream is introduced at a pressure of 5 to 10 psig below that of the inlet stream of the purifying compartments. A suitable antiscalant is injected into the outlet stream from the softening equipment to prevent scaling due to supersaturation of silica. An in-line static mixer 42 is provided to ensure the proper mixing of the antiscalant with the outlet stream from the softening equipment. The make-up stream 37 is blended with the high conductivity softened water make-up stream 38 from an ion exchange unit 7 to provide a sufficiently conducting concentrate stream 39. The resulting concentrate stream 39 is introduced into the concentrating compartments 30 and into the anode and cathode compartments 23 and 25 respectively. The electrode bleed-off stream 40 is diverted to drain 36 because it contains trace amounts of chlorine, hydrogen, and oxygen gases.

Figure 4:
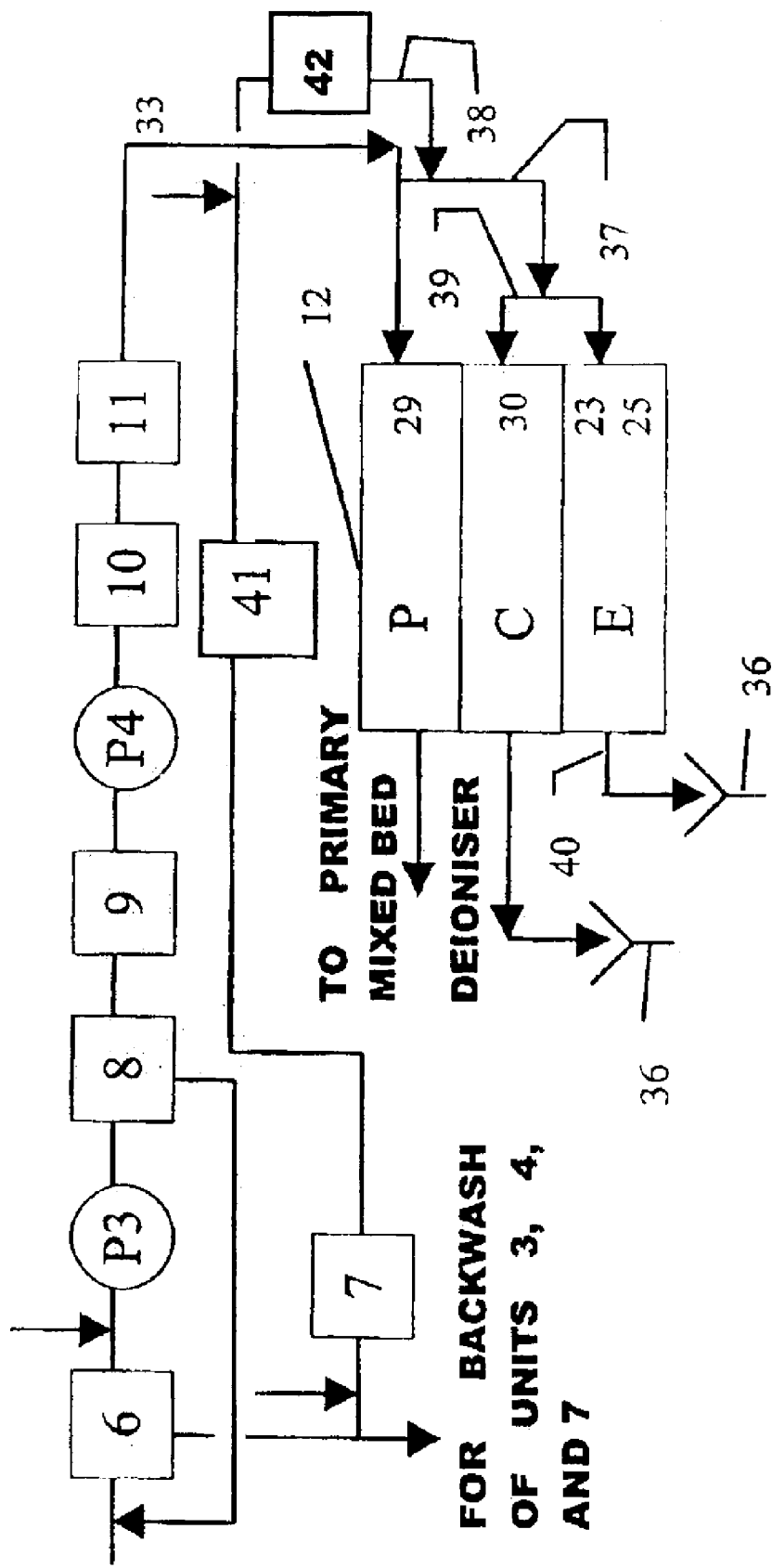
FIG. 4 is a flow diagram of another embodiment of combined reverse osmosis and continuous electrodeionization device.

Referring to FIG. 4, the CEDI Unit 12 is described without the concentrate recirculation. This configuration was utilized in the present experimental studies. It is important to note that hardness components, which originally exist in the concentrate water in small amounts, become increasingly concentrated as the concentrate water is circulated and reused and over time more rapidly deposit in the concentrate chambers or in the electrode chambers to form scales. The use of a once-through operation in the concentrate loop in accordance with the present invention prevents such scaling. The feed to the electrodeionization system is split into two streams, the supply stream 33 that flows into the purifying chamber and the make-up stream 37 that joins the concentrate stream 39. Water to be treated is introduced into the purifying compartment(s) 29 from supply stream 33. The supply stream 33 is deionized as it flows through the purifying compartment(s) 29 in the system. The make-up stream 37 is blended with the high conductivity softened water make-up stream 38 from ion exchange unit 7 to provide a sufficiently conducting concentrate stream 39. Ion exchange equipment 7 can be either standard reverse flow softener or weak acid cation exchanger in the sodium form, or ion exchanger containing macroreticular type aminophosphonic or iminodiacetic functional groups chelating resin. A pressure reducing valve (PRV) 41 is used in the make-up stream 38 to ensure that the concentrate and electrode feed stream is introduced at a pressure of 5 to 10 psig below that of the inlet stream of the purifying compartments. A suitable antiscalant is injected into the outlet stream from the softening equipment to prevent scaling due to supersaturation of silica. An in-line static mixer 42 is provided to ensure the proper mixing of the antiscalant with the outlet stream from the softening equipment. The resulting concentrate stream 39 is introduced into the concentrating compartments 30 and into the anode and cathode compartments 23 and 25 respectively. The concentrate bleed-off stream 35 and electrode bleed-off stream 40 are diverted to drain 36.

In previous CEDI units to provide an adequate concentration of ions in the concentrate stream a chemical, for example a brine solution, was added. Reject water from the first pass reverse osmosis unit provides water for the concentrate stream of the CEDI with high conductivity. The conductivity of the first pass reverse osmosis reject water is high enough that chemicals do not need to be added to the CEDI concentrate stream. This provides a savings in costs and chemical handling. A further advantage of using the first pass reverse osmosis reject water as part of the CEDI concentrate stream is that the higher conductivity of the concentrate stream allows the CEDI to be run at low temperatures. The higher conductivity of the concentrate stream keeps the total voltage drop across the electrodeionization cells within the maximum voltage limit of the device. Yet another advantage is a general increase in electric current flow due to the increased conductivity in the concentration chambers of the CEDI unit.

EXAMPLES

The invention is further described and elucidated in the following examples and teach one how to make use of the invention. These examples are not intended, however, to limit or restrict the scope of the invention in any way and should not be construed as providing conditions, parameters or values which must be utilized exclusively in order to practice the present invention.

A typical characteristic of the municipal water supply used in the present experimental study is as follows:

| | |
|---|---|
| Average feed pH | 7.5 |
| Average feed water temperature | 28 degree Celsius (82 degrees Fahrenheit) |
| Average Total Dissolved Solids (TDS) | 240 ppm |
| Average feed silica | 10 ppm |
| Average feed boron | 50 ppb |
| Average Total Organic Carbon (TOC) | 3.0 ppm |

City water was received in the raw water storage tank and is pumped by a multi-stage vertical centrifugal pump through the multimedia filter for the reduction of suspended solids. Coagulant (PAC) is added before the multimedia filter for coagulation of suspended solids and an in-line static-mixer is provided to ensure the proper mixing of the coagulant with water. Turbidity, silt density index (SDI) 15 minutes, and zeta potential are measured to determine the performance of the multimedia filter.

Turbidity is a measurement of the lack of clarity in a water sample. Turbidimeter measures the scattering of light caused by various particles and suspended solids in the water sample. These readings are typically given in Nephelometric Turbidity Unit (NTU). As turbidity readings exceed 1.0, they are indicative of a greater tendency for membrane fouling. Like the SDI test, turbidity is only an indicator of fouling potential. In fact, there are some foulants that are clear to the passage of light, and would not show up in a turbidity measurement. Although they are less than perfect as tools of analysis, turbidity and SDI measurements are useful for characterizing an RO feed water.

Experimental results indicate that the effluent turbidity is approximately about 0.1 NTU at the 2 ppm PAC dosing. The Accu4™ Low-range Turbidimeter System from GLI was used for the on-line monitoring of Turbidity at the outlet of the multimedia filter. This system has an auto-ranging measuring scale, enabling continuous monitoring over a 0–100 NTU range. The Filter Plugging Analyzer Model FPA-3300 from Chemetek (Portland, USA) was used for the on-line monitoring of SDI at various PAC dosing levels at the outlet of the Multimedia Filter. Experimental results indicate that the effluent 15 minutes SDI is approximately about 2.5 at the 2 ppm PAC dosing. A zetasizer 3000 HS from Malvern Instrument was used for the off-line monitoring of zeta potential at the inlet of the multimedia filter. At a PAC dosage of about 2 ppm, the zeta potential at the multimedia filter inlet approaches zero.

The filtered water from multimedia filter passed through the activated carbon filter for the removal of organics and residual chlorine. Sodium bisulphite dosing was provided prior to the activated carbon filter for the removal of free chlorine and dissolved oxygen. The treated water from the activated carbon filter was then taken to a 1-micron cartridge filter for the removal of fine solids. Sodium bisulphite removed chlorine completely and also reduced the dissolved oxygen level in the vicinity of 2.5–3.0 ppm. Total organic carbon (TOC) level in the activated carbon product water decreased from 3.0 ppm to below 1.8 ppm.

The following unit operations in the preferred embodiment are involved in the removal of ionic impurities prior to the electrodeionization apparatus 12.

First-pass reverse osmosis membrane filters 6. The membrane filters comprise 3:2 arrays of CPA2-4040 membrane elements (manufactured by Hydranautics) with 4 elements per vessel. First pass reverse osmosis elements are operating at an average flux rate of 12 gallons per square foot per day (GFD) and recovery ratio of 70%.

Second-pass reverse osmosis membrane filters 8. The membrane filters comprise 2:1 arrays of CPA2-4040 membrane elements (manufactured by Hydranautics) with 4 elements per vessel. Second pass reverse osmosis elements are operating at an average flux rate of 17 gallons per square foot per day (GFD) and recovery ratio of 85%. As a result, the overall recovery ratio is approximately 66.5%.

To ensure a negative LSI in the reject stream from the first pass reverse osmosis system, 2.0 ppm hydrochloric acid dosing was provided in the first pass feed water. A typical characteristic of the double pass product water obtained in the present experimental study is as follows:

| | |
|---|---|
| Average product pH | 5.2 |
| Average Total Dissolved Solids (TDS) | 0.3 ppm |
| Average product silica | 10 ppb |
| Average product boron | 8 ppb |
| Average Total Organic Carbon (TOC) | 50 ppb |

Using the preferred embodiment described above, a series of experiments were conducted around combined reverse osmosis/electrodeionization apparatus using various softening equipment for the first pass reverse osmosis reject stream at different recoveries around the electrodeionization apparatus. The D. C. Electric current through the electrodeionization apparatus was set at 4.6 Amps using a rectifier capable of a maximum output voltage of 600 Volts.

It was found in our experimental work that the type of softening equipment, the type and concentration of antiscalant strongly affect the performance of the electrodeionization apparatus. Operational results of the pilot test unit may be better appreciated by reference to Examples 1 through 5.

Finnigan Element 2 was used during this study for trace element analysis of boron, silica, sodium, potassium, calcium, and magnesium. Element 2 is a high-resolution inductively coupled plasma mass spectrometry which can analyze compounds—especially trace elements—in many different matrices. Dionex DX 500 ion-exchange chromatography (IC) was used in this study for the analysis of anionic impurities in the deionized water. Sievers 800 TOC analyzers were utilized in this study for online monitoring of the TOC levels (Ionics Instrument Business Group, Boulder, USA) at the inlet and outlet of the double pass reverse osmosis system.

Municipal water of a quality as shown in Table 1 was treated with double pass reverse osmosis equipment to obtain permeate water of a quality as shown in the same Table. This permeate water was used as feed water and partly concentrating water to be passed through purifying compartments and concentrating compartments, respectively, in electrodeionization water production equipment. The first pass reject stream from the reverse osmosis equipment passes through either standard reverse flow softener or weak acid cation resin preferably in the sodium form, or suitable chelating resin to remove the hardness elements. The first pass reject stream quality is also shown in Table 1. Adequate concentrate stream conductivity in the electrodeionization water production equipment was achieved by using softened first pass reject stream after the application of a suitable antiscalant to prevent scaling due to supersaturation of silica.

TABLE 1

Average performance of a double pass reverse osmosis equipment

| Parameter | Municipal water | RO permeate water | First pass reject water |
|---|---|---|---|
| pH | 7.5 | 5.2 | 7.6 |
| TDS, ppm | 240 | 0.3 | 713 |
| Electrical conductivity, microsiemens/cm | 438 | 0.7 | 1335 |
| Temperature, ° C. | 28 (82° F.) | 28 (82° F.) | 28 (82° F.) |
| Calcium, ppm | 20.0 | ND | 59.7 |
| Magnesium, ppm | 2.4 | ND | 7.2 |
| Sodium, ppm | 50.0 | 0.1 | 149.4 |
| Potassium, ppm | 3.0 | ND | 9.0 |
| Sulphate, ppm | 50.0 | ND | 149.3 |
| Chloride, ppm | 65.0 | 0.1 | 201.0 |
| Bicarbonate, ppm | 36.6 | 0.1 | 99.1 |
| Nitrate, ppm | 3.0 | 0.1 | 8.8 |
| Silica, ppm | 10.0 | 0.01 | 29.9 |

Note:
ND indicates that the actual value is below the instrument detection limit.

Details of the electrodeionization water production equipment used in the present experimental study are given below in Table 2:

TABLE 2

Performance of Electrodeionization equipment

| Parameter | Value |
|---|---|
| Design flowrate | 12.5 gallons per minute |
| Supplier | GE Water Technologies 52 Royal Road, Guelph Ontario, Canada N1H 1G3 |
| Model Number | E-Cell MK - 1E |
| Allowable pH | 5–9 |
| Maximum total exchangeable anion | 25 ppm as $CaCO_3$ |
| Maximum hardness in feed | 0.25 ppm as $CaCO_3$ |
| Maximum hardness in concentrate | 5.0 ppm as $CaCO_3$ |
| Maximum reactive silica in feed | 500 ppb |
| Maximum reactive silica in concentrate | 10 ppm |
| Maximum TOC in feed | 500 ppb |
| Maximum TOC in concentrate | 10 ppm |
| Maximum free chlorine in feed | 0.05 ppm |
| Range of operating temperature | 40–100° F. |
| Range of operating pressure | 45–100 psig |

Observed feed water parameters for the electrodeionization apparatus are given below in Table 3:

TABLE 3

Observed electrodeionization average feed water parameters

| Parameter | Observed value | Accepted range |
|---|---|---|
| Total exchangeable anion (TEA), ppm as calcium carbonate | 2.9 | 0–25.0 |
| Total exchangeable cation (TEC), ppm as calcium carbonate | 0.4 | 0–25.0 |
| Carbon dioxide, ppm | 1.2 | 0–13.2 |
| Alkalinity, ppm as calcium carbonate | 0.1 | 0–20.0 |
| Hardness, ppm as calcium carbonate | <0.02 | 0–1.0 |
| Silica, ppb | 10 | 0–500 |
| Conductivity, microsiemens/cm | 0.7 | 0–62.0 |

In this case, the use of softening equipment for the first pass reverse osmosis reject stream were varied as shown below for effecting deionization treatment. Throughout this experimental study, the flowrate through the concentrating compartments were kept constant at 4.5 gpm. Operating the concentrate stream at such a high flowrate prevents scales from forming in the concentrate compartments. Moreover the concentrate water was not recirculated, as adequate concentrate flowrate is available from the softened first pass reverse osmosis reject stream. It is important to note that hardness components, which originally exist in the concentrate water in small amounts, become increasingly concentrated as the concentrate water is circulated and reused and over time more rapidly deposit in the concentrate chambers or in the electrode chambers to form scales. The use of a once-through operation in the concentrate loop prevents such scaling. In the present experimental study, the product water flowrate was also kept constant at 12.5 gpm. The flowrate of the softened first pass reject stream from the reverse osmosis equipment through the concentrating compartments were varied to obtain different recoveries around the electrodeionization water production equipment. The results were evaluated by measuring the stack voltage, electrical resistivity of the treated water and observing any scale deposits within the concentrating chambers and the electrode chambers after 30 days of continuous operation. The presence of scales reduces the electric current flows at the respective sections when the necessary applied voltage exceeds the maximum voltage of the device. In this case, sufficient current for ion removal cannot be applied, and the quality of the treated water deteriorates.

The D.C. Electric current through the electrodeionization apparatus was set at 4.6 Amps using a rectifier capable of a maximum output voltage of 600 Volts.

Example 1

A standard reverse flow softener was used to remove the hardness elements from the first pass reverse osmosis reject stream. The ion exchange resin was of a sulphonic acid type cation exchange resin (trade name: Amberjet 1200 Na manufactured by Rohm and Haas). A 250 mm external diameter reverse flow softener was used in the present experimental study for a maximum water flowrate of 7.0 gpm and a cycle time of 8.0 hours. The resin volume was 50 liters. Space velocity through the vessel was 32.4 BV/h at 7.0-gpm flowrate. Regeneration was conducted with 10% brine solution at a level of 150 grams per liter of resin. This standard reverse flow softener achieved an outlet hardness of about 1.5 ppm as calcium carbonate. The conductivity of the softened water was in the range of 1300–1600 microsiemens/cm. This conductivity of the softened water was about 3 times that of the source water supply because the reverse osmosis system was operating at an overall recovery ratio of 66.5%. A pressure reducing valve (PRV) Type V 82 (manufactured by George Fischer) was used in the outlet stream from the standard reverse flow softener to ensure that the concentrate and electrode feed stream is introduced at a pressure of 5 to 10 psig below that of the inlet stream of the purifying compartments in the electrodeionization apparatus.

Pretreat Plus™ 0100 antiscalant (manufactured by King Lee Technologies) was injected into electrodeionization concentrate stream using a static mixer to retard polymerization and precipitation of silica. This antiscalant does not flocculate dissolved iron/aluminum oxide/silica complexes. It was useful at a dosage level of 4.5 ppm.

Recovery around the electrodeionization water production equipment was set at 90%. At the start of the experiment, the maximum applied voltage of 600 Volts produced a current of 2.9 Amps, but this current increased to the set point of 4.6 Amps while the voltage dropped to 480 Volts and remained at this level for the duration of the experiment (720 hours). The product water maintained a resistivity value over 17.1 megaohm-cm for the duration of the experiment. The silica level in the product water decreased from 10 ppb to below 100 ppt. The boron level in the product water decreased from 8 ppb to below 100 ppt. The constant voltage and consistently high product water resistivity indicate the absence of significant scaling within the concentrating chambers and the electrode chambers.

Example 2

A comparative experiment was conducted with the use of above standard reverse flow softener with the exception of operating the electrodeionization apparatus at a recovery of 95%. This standard reverse flow softener achieved an outlet hardness of about 1.5 ppm as calcium carbonate. The conductivity of the softened water was in the range of 1300–1600 microsiemens/cm. This conductivity of the softened water was about 3 times that of the source water supply because the reverse osmosis system was operating at an overall recovery ratio of 66.5%. A pressure reducing valve (PRV) Type V 82 (manufactured by George Fischer) was used in the outlet stream from the standard reverse flow softener to ensure that the concentrate and electrode feed stream is introduced at a pressure of 5 to 10 psig below that of the inlet stream of the purifying compartments in the electrodeionization apparatus. Any suitable pressure reducing valve may be used. The injection of Pretreat Plus™ 0100 antiscalant (manufactured by King Lee Technologies) at a dosage level of 4.5 ppm was maintained in this experimental study. The target operating current of 4.6 Amps was passed with the available 600 Volts D. C. For the first few hours, and the current then decreased steadily to 1.8 Amps over the duration of the experiment (720 hours). The product water resistivity has an initial value of 16.8 megaohm-cm, but decreased to 9.0 megaohm-cm after 160 hours of operation, and further decreased to less than 1.2 megaohm-cm after 720 hours of operation. This result clearly indicates the formation of scale on the concentrate chamber side of the anion membranes. Some scale deposition was observed and a part of the flow line was blocked.

Example 3

A weak acid cation resin in the sodium form was used to remove the hardness elements from the first pass reverse osmosis reject stream. Sodium hydroxide was added to the feed stream so that alkalinity exceeded the total hardness. The ion exchange resin was of a carboxylic acid type cation exchange resin (trade name: Amberlite IRC 86 manufactured by Rohm and Haas). A 300 mm external diameter weak acid cation exchanger was used in the present experimental study for a maximum water flowrate of 8.0 gpm and a cycle time of 20.0 hours. The resin volume was 75 liters. Space velocity through the vessel was 24.0 BV/h at 8.0-gpm flowrate. Regeneration was conducted with 5% hydrochloric acid at a level of 78 grams per liter of resin, which is equivalent to 110% regeneration ratio. Subsequently, sodium hydroxide conditioning was performed to convert the regenerated resin to the sodium form. This sodium conversion was performed in the upflow manner to avoid bed compression. Because resin (delivered in hydrogen form) swells 50 to 60% to the sodium form, vessel sizing was done accordingly. This weak acid cation exchanger in the sodium form achieved an outlet hardness of about 0.5 ppm as calcium carbonate. The conductivity of the softened water was in the range of 1300–1600 microsiemens/cm. This conductivity of the softened water was about 3 times that of the source water supply because the reverse osmosis system was operating at an overall recovery ratio of 66.5%. A pressure reducing valve (PRV) Type V 82 (manufactured by George Fischer) was used in the outlet stream from the weak acid cation exchanger to ensure that the concentrate and electrode feed stream is introduced at a pressure of 5 to 10 psig below that of the inlet stream of the purifying compartments in the electrodeionization apparatus.

The injection of Pretreat Plus™ 0100 antiscalant (manufactured by King Lee Technologies) at a dosage level of 4.5 ppm was maintained in this experimental study.

Recovery around the electrodeionization water production equipment was set at 95%. At the start of the experiment, the maximum applied voltage of 600 Volts produced a current of 3.1 Amps, but this current increased to the set point of 4.6 Amps while the voltage dropped to 460 Volts and remained at this level for the duration of the experiment (720 hours). The product water maintained a resistivity value over 17.0 megaohm-cm for the duration of the experiment. The silica level in the product water decreased from 10 ppb to below 100 ppt. The boron level in the product water decreased from 8 ppb to below 100 ppt. The constant voltage and consistently high product water resistivity indicate the absence of significant scaling within the concentrating chambers and the electrode chambers.

Example 4

A suitable chelating resin was used to remove the hardness elements from the first pass reverse osmosis reject stream. The ion exchange resin was of a macroreticular type with aminophosphonic functional groups resin (trade name: Amberlite IRC 747 manufactured by Rohm and Haas). The chemical nature of these groups is such that they form complexes with metal ions. Amberlite IRC 747 is an efficient resin for the removal of hardness elements and other metals in the water streams. The ion exchanger was operated at a space velocity of 15 BV/h. This ion exchanger containing macroreticular type aminophosphonic functional groups chelating resin in the sodium form achieved an outlet hardness of about 25 ppb as calcium carbonate. The conductivity of the softened water was in the range of 1300–1600 microsiemens/cm. This conductivity of the softened water was about 3 times that of the source water supply because the reverse osmosis system was operating at an overall recovery ratio of 66.5%. A pressure reducing valve (PRV) Type V 82 (manufactured by George Fischer) was used in the outlet stream from the ion exchanger containing macroreticular type aminophosphonic functional groups chelating resin to ensure that the concentrate and electrode feed stream is introduced at a pressure of 5 to 10 psig below that of the inlet stream of the purifying compartments in the electrodeionization apparatus.

The injection of Pretreat Plus™ 0100 antiscalant (manufactured by King Lee Technologies) at a dosage level of 4.5 ppm was maintained in this experimental study.

Recovery around the electrodeionization water production equipment was set at 98%. At the start of the experiment, the maximum applied voltage of 600 Volts produced a current of 3.2 Amps, but this current increased to the set point of 4.6 Amps while the voltage dropped to 450 Volts and remained at this level for the duration of the experiment (720 hours). The product water maintained a resistivity value over 17.4 megaohm-cm for the duration of the experiment. The silica level in the product water decreased from 10 ppb to below 100 ppt. The boron level in the product water decreased from 8 ppb to below 100 ppt. The constant voltage and consistently high product water resistivity indicate the absence of significant scaling within the concentrating chambers and the electrode chambers.

Example 5

A suitable chelating resin was used to remove the hardness elements from the first pass reverse osmosis reject stream. The ion exchange resin was of a macroreticular type iminodiacetic acid functionally chelating resin in the sodium form (trade name: Amberlite IRC 740 manufactured by Rohm and Haas). The chemical nature of these groups is such that they form complexes with metal ions. Amberlite IRC 748 is an efficient resin for the removal of hardness elements and other metals in the water streams. The ion exchanger was operated at a space velocity of 15 BV/h. This ion exchanger containing macroreticular type iminodiacetic acid functionality chelating resin in the sodium form achieved an outlet hardness of about 25 ppb as calcium carbonate. The conductivity of the softened water was in the range of 1300–1600 microsiemens/cm. This conductivity of the softened water was about 3 times that of the source water supply because the reverse osmosis system was operating at an overall recovery ratio of 66.5%. A pressure reducing valve (PRV) Type V 82 (manufactured by George Fischer) was used in the outlet stream from the ion exchanger containing macroreticular type iminodiacetic acid functionality chelating resin to ensure that the concentrate and electrode feed stream is introduced at a pressure of 5 to 10 psig below that of the inlet stream of the purifying compartments in the electrodeionization apparatus.

The injection of Pretreat Plus™ 0100 antiscalant (manufactured by King Lee Technologies) at a dosage level of 4.5 ppm was maintained in this experimental study.

Recovery around the electrodeionization water production equipment was set at 98%. At the start of the experiment, the maximum applied voltage of 600 Volts produced a current of 3.1 Amps, but this current increased to the set point of 4.6 Amps while the voltage dropped to 460 Volts and remained at this level for the duration of the experiment (720 hours). The product water maintained a resistivity value over 17.3 megaohm-cm for the duration of the experiment. The silica level in the product water decreased from 10 ppb to below 100 ppt. The boron level in the product water decreased from 8 ppb to below 100 ppt. The constant voltage and consistently high product water resistivity indicate the absence of significant scaling within the concentrating chambers and the electrode chambers.

Use of a macroreticular resin as described in examples 4 and 5 has the advantages of high resistance to osmotic shock and improved kinetics of ion exchange over gel-type resins (for example those used in Examples 1 to 3).

The foregoing describes the invention including preferred forms thereof. Alterations and modifications as will be obvious to those skilled in the art are intended to be incorporated in the scope hereof as defined by the accompanying claims.

We claim:

1. A method of water purification including the steps of:
   directing source water through at least one reverse osmosis unit to produce product water and reject water,
   directing the product water from a reverse osmosis unit into the dilution stream of a continuous electrodeionization unit,
   directing the reject water from the first pass reverse osmosis unit through a softening unit to produce softening unit output water with fewer hardness elements than the reject water from the first pass reverse osmosis unit,
   directing the softening unit output water into concentrate and electrode streams of the continuous electrodeionization unit, and
   wherein the continuous electrodeionization unit further purifies the water from the dilution stream to produce purified water.

2. A method of water purification as claimed in claim 1 wherein the water softening unit is standard reverse flow softening.

3. A method of water purification as claimed in claim 2 where in the standard reverse flow softener contains a uniform particle size strong acid cation resin in the sodium form.

4. A method of water purification as claimed in claim 3 wherein the step of directing the first pass reject stream from the reverse osmosis unit through the standard reverse flow softener achieves softening unit output water with hardness to below about 1.5 ppm as calcium carbonate for most first pass reverse osmosis reject waters.

5. A method of water purification as claimed in claim 3 wherein the resin of the standard reverse flow softener needs to be regenerated after exhaustion with 10% brine solution at a regeneration level in the vicinity of 150 grams per liter of resin.

6. A method of water purification as claimed in claim 1 wherein the water softening unit is softening by passage through or past a weak acid cation resin.

7. A method of water purification as claimed in claim 6 wherein the weak acid cation resin contains carboxylic acid groups in the sodium form.

8. A method of water purification as claimed in claim 7 wherein the step of directing the first pass reject stream from the reverse osmosis unit through the weak acid cation exchange resin to produce softening unit output water with hardness in the softening unit output water to below about 0.5 ppm as calcium carbonate for most first pass reverse osmosis reject waters.

9. A method of water purification as claimed in claim 7 wherein the step of directing the first pass reject stream from the reverse osmosis unit through the weak acid cation exchange resin requires pH adjustment of the feed water using either sodium hydroxide or sodium carbonate to increase alkalinity up to total hardness level.

10. A method of water purification as claimed in claim 7 wherein the step of directing the first pass reject stream from the reverse osmosis unit through the weak acid cation exchange resin to produce softening unit output water uses upflow technique for the sodium conversion to avoid bed compression.

11. A method of water purification as claimed in claim 7 wherein the step of directing the first pass reject stream from the reverse osmosis unit through the weak acid cation exchange resin to produce softening unit output water needs to account for the 50 to 60% swelling expansion from hydrogen to sodium form in sizing the ion exchange vessel.

12. A method of water purification as claimed in claim 7 wherein the step of directing the first pass reject stream from the reverse osmosis unit through the weak acid cation exchange resin to produce softening unit output water needs to be regenerated after exhaustion with 5% hydrochloric acid at a regeneration ratio of about 110% followed by conditioning with 5% sodium hydroxide solution.

13. A method of water purification as claimed in claim 1 wherein the water softening unit is softening with a suitable chelating resin.

14. A method of water purification as claimed in claim 13 wherein the softening unit uses a macroreticular aminophosphonic function groups chelating resin in the sodium form.

15. A method of water purification as claimed in claim 14 wherein the step of directing the first pass reverse osmosis reject water through a macroreticular aminophosphonic function groups chelating resin achieves hardness in the softening unit output water to below about 25 ppb as calcium carbonate for most first pass reverse osmosis reject waters.

16. A method of water purification as claimed in claim 14 wherein the step of directing the first pass reverse osmosis reject water through a macroreticular aminophosphonic function groups chelating resin runs at a space velocity in the vicinity of 15 BV/h for optimum operating efficiency.

17. A method of water purification as claimed in claim 14 wherein the step of directing the first pass reverse osmosis reject water through a macroreticular aminophosphonic function groups chelating resin uses upflow techniques for the sodium conversion to avoid bed compression.

18. A method of water purification as claimed in claim 14 wherein the step of directing the first pass reverse osmosis reject water through a macroreticular aminophosphonic function groups chelating resin needs to account for about 45% swelling expansion from hydrogen to sodium in sizing the ion exchange vessel.

19. A method of water purification as claimed in claim 13 wherein the softening unit uses a macroreticular iminodiacetic acid function groups chelating resin in the sodium form.

20. A method of water purification as claimed in claim 19 wherein the step of directing the first pass reverse osmosis reject water through a macroreticular iminodiacetic acid function groups chelating resin in the sodium form achieves hardness in the softening unit output water to below about 25 ppb as calcium carbonate for most first pass reverse osmosis reject waters.

21. A method of water purification as claimed in claim 19 wherein the step of directing the first pass reverse osmosis reject water through a macroreticular iminodiacetic acid function groups chelating resin in the sodium form runs at a space velocity in the vicinity of 15 BV/h for optimum operating efficiency.

22. A method of water purification as claimed in claim 19 wherein the step of directing the first pass reverse osmosis reject water through a macroreticular iminodiacetic acid function groups chelating resin in the sodium form uses upflow techniques for the sodium conversion to avoid bed compression.

23. A method of water purification as claimed in claim 19 wherein the step of directing the first pass reverse osmosis reject water through a macroreticular iminodiacetic acid function groups chelating resin in the sodium form needs to account for about 40% swelling expansion from hydrogen to sodium in sizing the ion exchange vessel.

24. A method of water purification as claimed in claim 1 wherein an antiscalant is added to the reject water after the softening unit.

25. A method of water purification as claimed in claim 1 wherein the product water from the reverse osmosis unit is passed through a primary UV TOC process before being directed to the dilution stream of the continuous electrodeionization unit.

26. A method of water purification as claimed in claim 25 wherein the UV TOC reducer produces UV TOC product water with TOC below 50 ppb for most product waters from the reverse osmosis unit.

27. A method of water purification as claimed in claim 25 wherein the UV TOC product water is passed through a primary membrane degassifier before being directed to the dilution stream of the continuous electrodeionization unit.

28. A method of water purification as claimed in claim 27 wherein the membrane degassifier product water has dissolved oxygen below about 100 ppb for most UV TOC product waters.

29. A method of water purification as claimed in claim 27 where the membrane degassifier product water has dissolved carbon dioxide to below about 5 ppm for most UV TOC product waters.

30. A method of water purification as claimed in claim 1 wherein the continuous electrodeionization operation uses the concentrate stream only once through the electrodeionization unit to minimize scaling in the concentrate and/or electrode chambers.

31. A method of water purification as claimed in claim 1 wherein the source water is passed through a pre-treatment system prior to the first reverse osmosis unit.

32. A method of water purification as claimed in claim 31 wherein the pre-treatment includes mixing a coagulant into the source water to coagulate suspended solids in the source water and passing the source water mixed with the coagulant through a multimedia filter to remove suspended solids in the source water.

33. A method of water purification as claimed in claim 32 wherein the pre-treatment includes passing the output water from the multimedia filter through an activated carbon filter to remove organics and residual chlorine from the source water.

34. A method of water purification as claimed in claim 33 wherein the pre-treatment includes passing the output water from the activated carbon filter through a cartridge filter to remove fine solids.

35. A method of water purification as claimed in claim 31 wherein passing the source water through the pre-treatment system achieves a free chlorine level of about 0.05 ppm for most source waters.

36. A method of water purification as claimed in claim 31 wherein passing the source water through the pre-treatment system achieves a silt density index (15 Minutes) to below about 3.0 for most source waters.

37. A method of water purification as claimed in claim 31 wherein passing the source water through the pre-treatment system achieves turbidity to below about 1.0 NTU for most source waters.

38. A method of water purification as claimed in claim 1 wherein the reverse osmosis system maintains a product water pH value of between about 5 and 9 for most source waters.

39. A method of water purification as claimed in claim 1 wherein the reverse osmosis system achieves conductivity to below about 62 micro-siemens/cm for most source waters.

40. A method of water purification as claimed in claim 1 wherein the reverse osmosis system achieves total exchangeable anions to below about 25 ppm for most source waters.

41. A method of water purification as claimed in claim 1 wherein the reverse osmosis system achieves total exchangeable cation to below about 25 ppm for most source waters.

42. A method of water purification as claimed in claim 1 wherein the reverse osmosis system achieves hardness to below about 0.5 ppm as calcium carbonate for most source waters.

43. A method of water purification as claimed in claim 1 wherein the reverse osmosis system achieves silica to below 500 ppb for most source waters.

44. A method of water purification as claimed in claim 1 wherein the reverse osmosis system achieves boron to below about 300 ppb for most source waters.

45. A method of water purification as claimed in claim 1 wherein the reverse osmosis system achieves iron, manganese and hydrogen sulphide to below about 0.01 ppm each for most source waters.

46. A method of water purification as claimed in claim 1 wherein the reverse osmosis system achieves total organic carbon to below about 500 ppb for most source waters.

47. A method of water purification as claimed in claim 1 wherein the reverse osmosis system eliminates oil and grease to below instrument detection levels for most source waters.

48. A method of water purification as claimed in claim 1 wherein the reverse osmosis system achieves a silt density index (15 minutes) to below about 1.0 for most source waters.

49. A method of water purification as claimed in claim 1 wherein after directing the first pass reverse osmosis reject water through a softening unit an antiscalant is added to the softening unit output water in the range of 1–25 ppm, so that scaling in the concentration chambers of the electrodeionization unit due to the supersaturation of silica can be inhibited.

50. A method of water purification as claimed in claim 1 wherein the concentrate and electrode stream is introduced at a pressure of 5–10 psig below that of the of the inlet stream of the purifying compartments by use of a pressure reducing valve in the outlet stream of the softening equipment.

51. A method of water purification as claimed in claim 1 wherein when the water softening unit is a standard reverse flow softener containing a uniform particle size strong acid cation resin in the sodium form, the continuous electrodeionization unit achieves a recovery rate of about 90%.

52. A method of water purification as claimed in claim 1 wherein when the water softening unit is a weak acid cation exchanger containing resin with carboxylic acid groups in the sodium form, the continuous electrodeionization unit achieves a recovery rate of about 95%.

53. A method of water purification as claimed in claim 1 wherein when the water softening unit is an ion exchanger containing suitable macroreticular type aminophosphonic functional groups chelating resin in the sodium form, the continuous electrodeionization unit achieves a recovery rate of about 98%.

54. A method of water purification as claimed in claim 1 wherein when the water softening unit is with an ion exchanger containing suitable macroreticular type iminodiacetic acid functional groups chelating resin in the sodium form, the continuous electrodeionization unit achieves a recovery rate of about 98%.

55. A method of water purification as claimed in claim 1 wherein the electrodeionization concentrate stream achieves conductivity of about 2.5 to about 6.67 times that of the source water when the reverse osmosis system operates at an overall recovery ratio in the range of 60 to 85%.

56. A method of water purification as claimed in claim 1 wherein the purified water from the continuous electrodeionization unit achieves a silica level below 100 ppt.

57. A method of water purification as claimed in claim 1 wherein the continuous electrodeionization unit achieves silica rejection in the vicinity of 99%.

58. A method of water purification as claimed in claim 1 wherein the purified water from the continuous electrodeionization unit achieves a boron level below 100 ppt.

59. A method of water purification as claimed in claim 1 wherein the continuous electrodeionization unit achieves boron rejection in the vicinity of 98.75%.

60. A method of water purification as claimed in claim 1 wherein the continuous electrodeionization device achieves a resistivity of about 17.0 megaohm-cm at 25 degrees C. (77 degrees F.).

\* \* \* \* \*